United States Patent
Genero

[11] Patent Number: 5,706,796
[45] Date of Patent: Jan. 13, 1998

[54] HEAT DIFFUSION OVENS

[76] Inventor: Nivardo Blasoni Genero, Calle 78 entre Avenida 13 y 13A, Maracaibo Estado Zulia, Venezuela

[21] Appl. No.: 699,088

[22] Filed: Aug. 16, 1996

[51] Int. Cl.[6] .................................................. F24C 15/32
[52] U.S. Cl. .................. 126/21 R; 126/151; 126/273 R; 34/233
[58] Field of Search .................. 126/21 R, 21 A, 126/19 R, 20, 41 R, 146, 151, 273 R, 275 R; 34/218, 231, 233, 232

[56] References Cited

U.S. PATENT DOCUMENTS

| | | | |
|---|---|---|---|
| 979,413 | 12/1910 | Best | 126/273 R |
| 1,997,192 | 4/1935 | Kasamis | 126/41 R |
| 2,370,644 | 3/1945 | Esson | 126/151 |
| 4,416,250 | 11/1983 | Kuzia | 126/146 |
| 5,016,606 | 5/1991 | Himmel et al. | 126/21 R |

*Primary Examiner*—James C. Yeung
*Attorney, Agent, or Firm*—J. Sanchelima

[57] ABSTRACT

An oven structure that includes a housing with an internal refractory surface and two heat diffusion walls with apertures at spaced apart and parallel relationship with respect to each other defining a centrally disposed baking chamber and two combustion chambers. The apertures allow a predetermined amount of heat to pass through to the baking chamber without affecting the object being baked by direct contact with flames or other areas with excessive heat concentration. A uniform temperature is maintained within the baking chamber with the hot gases passing through the apertures to the baking chamber where high pressure is developed but the top with the hottest gases and push the mass of gases with a lower temperature down and into the exhaust system.

5 Claims, 2 Drawing Sheets

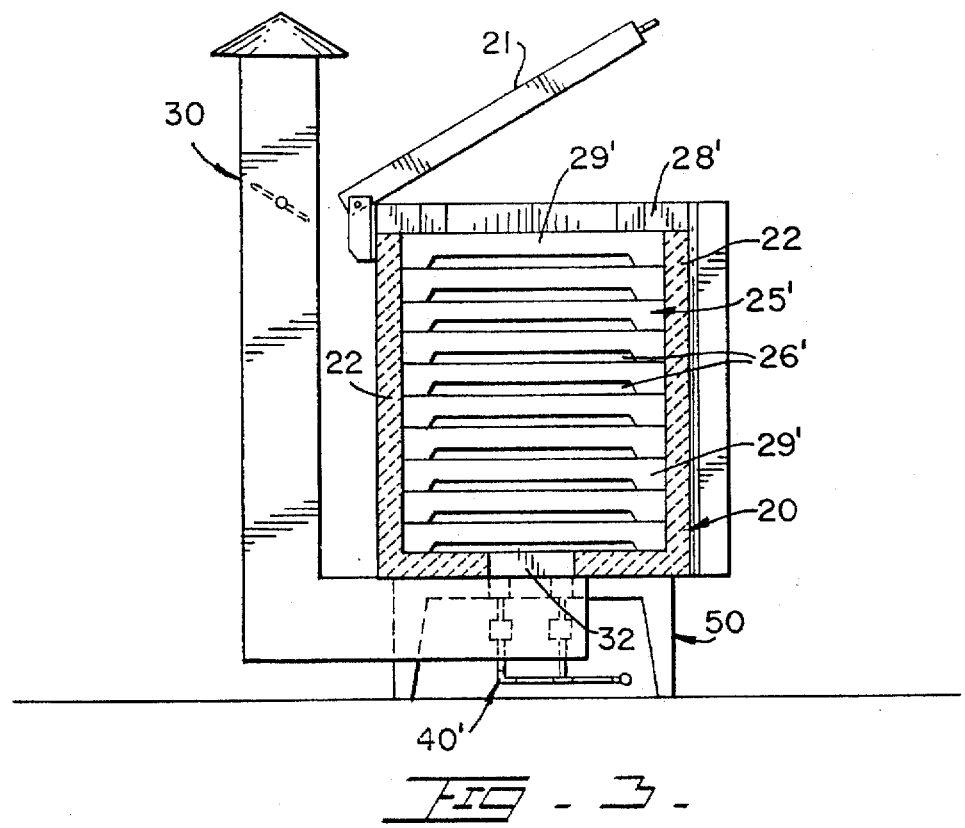
FIG - 3 -
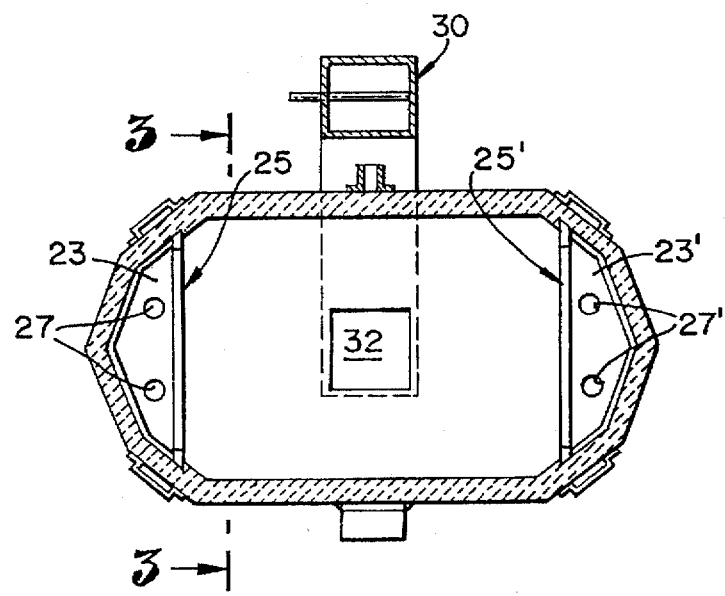
FIG - 4 -

HEAT DIFFUSION OVENS

II. BACKGROUND OF THE INVENTION

1. Field of the invention

The present invention relates to gas ovens and more particularly to the type that has such a deflection structure that causes heat to diffuse avoiding high temperature concentration.

2. Description of the related art

There have been numerous designs of industrial ovens for baking, roasting, and/or burking objects made out of different materials such as clay and others. However, one of the problems with the conventional designs is that the flame of the heat source comes in contact with the objects being baked, breaking them and/or altering their color. The invention claimed herein obviates this problem providing a constant source of diffused heat that permeates into the baking chamber maximizing the uniformity of the temperature therein.

Another problem with small (less than one cubic meter) ovens is that the flame can not be placed inside the baking chamber without burning the object being baked. This limitation of small ovens are obviated with the present invention without wasting space.

III. SUMMARY OF THE INVENTION

It is one of the main objects of the present invention to provide an oven structure where the objects being baked are isolated from the flame and other direct sources of heat.

It is another object of the present invention to provide an oven structure with efficient fuel consumption.

It is another object of the present invention to provide an oven structure that is portable and sufficiently light to be transported.

It is yet another object of the present invention to provide an oven structure that is volumetrically efficient requiring a minimum space for storage when disassembled.

IV. BRIEF DESCRIPTION OF THE DRAWINGS

FIG. 3 is a cross-sectional view of the interior of the oven structure, taken along line 3—3 in FIG. 4.

FIG. 4 is a cross-sectional view from the top of the oven structure, taken along line 4—4 in page 2.

V. DETAILED DESCRIPTION OF THE PREFERRED EMBODIMENT

Figure 1:
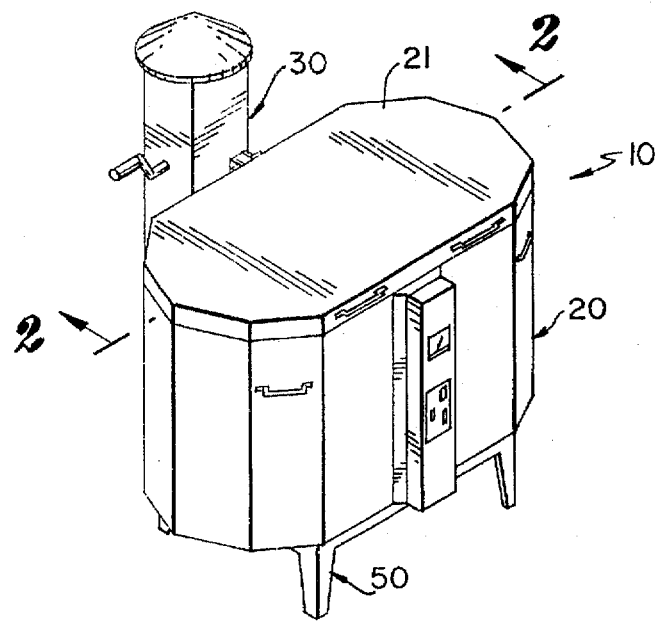
FIG. 1 is an isometric view of the oven structure subject of the present application.
Figure 2:
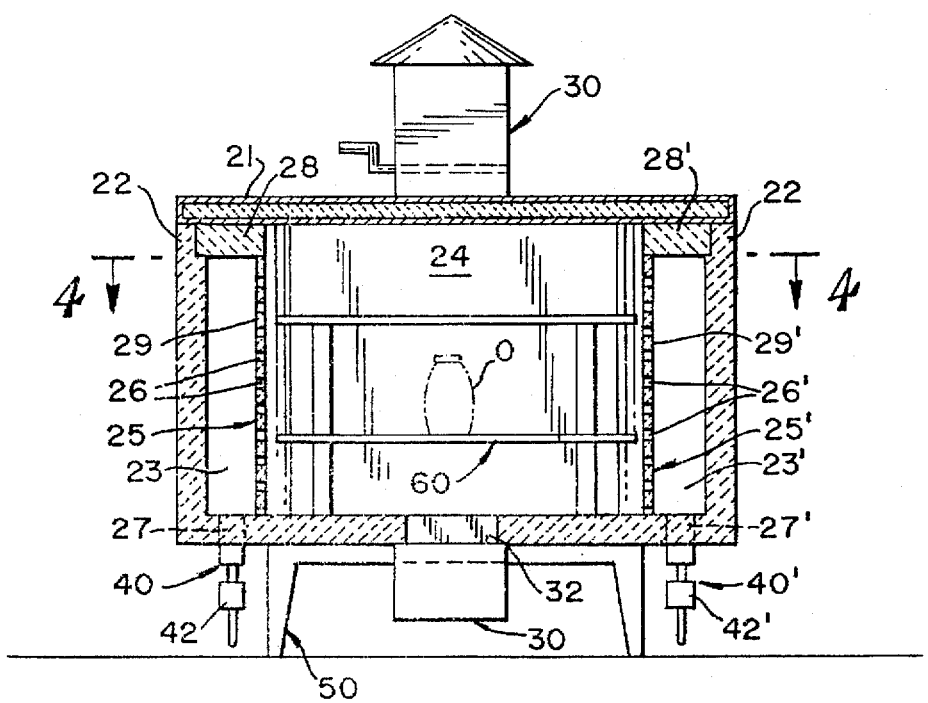
FIG. 2 is an elevational cross-section of the oven structure taken along line 2—2 in FIG. 1

As it can be seen from the figures, the present invention is generally referred to with numeral 10 and it includes housing 20, chimney assembly 30, heat source assemblies 40 and 40' and feet members 50.

Housing 20, in the preferred embodiment, has lid member 21 hingedly mounted to the top of housing 20 and inner walls 22. Inner walls 22 define the inner cavity of oven 10 and are made out of a refractory material to isolate the baking area from the external environment. Housing 20 includes two lateral combustion chambers 23 and 23' and baking chamber 24. Combustion chambers 23 and 23' are defined by walls 22 of housing 20 and two heat diffusion walls 25 and 25'. Heat diffusion walls 25 and 25' are at a spaced-apart relationship to each other and extend along entire length. Walls 25 and 25' include apertures 26 and 26' that connect combustion chamber 23 and 23', respectively, to baking chamber 24. Walls 25 and 25' are formed in the stackable cooperating members 29 and 29' that form apertures 26 and 26'. The total area of apertures 26 and 26' are, in the preferred embodiment, approximately 30% of the area of walls 25 and 25'. By varying the relative area of apertures 26 and 26' with different sets of members 29 and 29', the resulting heat gradient can thus be altered. Depending on the application, the area of the openings could go from 10 to 90% of the area of walls 25 and 25'. Baking chamber 24 is centrally disposed and at its lower part is connected through opening 32 to chimney assembly 30 to permit the heated gases to exit from the lowermost area of baking chamber 24. The hotter gases are accumulated at the top pushing down the gas mass with lower temperature (heavier).

The interior of oven 10 is accessible for cleaning purposes through lid member 21 that is hingedly mounted to the top of housing 20. Combustion chambers 23 and 23' are cleaned by releasing upper cap members 28 and 28', respectively, and leaving a free-way inlet for the cleaning operations.

Gas burning elements 42 and 42' of heat source assembly 40 are mounted below combustion chambers 23 and 23' so that their flame (not shown) is partially housed within through openings 27 and 27'.

The heat generated by burning elements 42 and 42' is concentrated inside combustion chambers 23 and 23', respectively, and the heat is diffused through apertures 26 and 26' into baking chamber 24. In this manner, the direct source of heat from the burning elements 42 and 42' do not come in contact with object O within baking chamber 24. In this manner, avoiding the direct heat exposure minimizes the chances of breaking the objects being baked. Objects O are placed on supporting grill assembly 60. In this manner object O is not in direct contact with the inner surfaces of baking chamber 24.

Stackable members 29 and 29' can be readily disassembled for easy transportation and volumetric efficient storage. This feature gives considerable flexibility to the user in regulating the heat gradient characteristics inside the oven which are maintained substantially uniform within baking chamber 24. Different designs of members 29 and 29' define apertures 26 and 26' of different dimensions, depending on the application. Also, since members 29 and 29' are removable, access to the interior of the oven is facilitated in order to allow for maintenance and cleaning operations.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An oven structure, comprising:

A) housing means having a centrally disposed baking chamber, first and second adjacent combustion chambers sandwiching said baking chamber;

B) first and second heat diffusion walls separating said combustion chambers from said baking chamber, said first and second heat diffusion walls include each a plurality of openings wherein said first and second heat diffusion walls include a plurality of cooperating stackable members defining said openings in between adjacent members;

C) means for heating up the space within said combustion chambers; and

D) exhaust means that permits the heated gases inside said baking chamber to exit so that a substantially uniform temperature is maintained within said baking chamber.

2. The oven structure set forth in claim 1, wherein said baking chamber and said first and second chambers include inner surfaces made out of a refractory material.

3. The oven structure set forth in claim 2, wherein the area of said openings is between 10 and 90% of the area of said first and second diffusion walls.

4. The oven structure set forth in claim 3, wherein the area of said openings is about 30% of the area of said first and second diffusion walls.

5. The oven structure set forth in claim 4, wherein said exhaust means are connected to the lowermost part of said baking chamber.

\* \* \* \* \*